United States Patent [19]

Van Vleet et al.

[11] Patent Number: 4,596,406
[45] Date of Patent: Jun. 24, 1986

[54] QUICK CHANGE BALL HITCH APPARATUS

[76] Inventors: Robert D. Van Vleet; Robert G. Van Vleet, both of P.O. Box 199, Sidney, Nebr. 69162

[21] Appl. No.: 775,651

[22] Filed: Sep. 13, 1985

[51] Int. Cl.⁴ .............................................. B60D 1/06
[52] U.S. Cl. ............................... 280/511; 280/415 A; 285/271; 403/131; 403/328
[58] Field of Search .............. 280/415 R, 415 A, 511, 280/504, 515; 403/131, 328; 285/271, 269, 91

[56] References Cited

U.S. PATENT DOCUMENTS

| | | | |
|---|---|---|---|
| 904,296 | 11/1908 | Bashford | 280/96.1 |
| 2,297,182 | 9/1942 | Weiss | 280/511 |
| 2,341,544 | 2/1944 | Gruender | 241/207 |
| 2,372,931 | 4/1945 | Bregin | 82/43 |
| 2,394,669 | 2/1946 | Dean | 464/32 |
| 2,474,360 | 6/1949 | Jimerson | 403/328 |
| 2,479,807 | 8/1949 | Bertea | 403/379 |
| 2,911,233 | 11/1959 | Riddle | 280/415 A |
| 3,864,048 | 2/1975 | Parker | 403/328 X |
| 4,193,611 | 3/1980 | Fisk | 280/515 X |
| 4,201,400 | 5/1980 | Hoogenbosch | 280/511 |
| 4,319,766 | 3/1982 | Corteg et al. | 280/511 |
| 4,433,854 | 2/1984 | Smith | 280/511 |
| 4,522,421 | 6/1985 | Vance | 280/415 A X |

Primary Examiner—John J. Love
Assistant Examiner—Mitchell J. Hill
Attorney, Agent, or Firm—Merchant, Gould, Smith, Edell, Welter & Schmidt

[57] ABSTRACT

A ball hitch connector (10) for use with a conventional ball hitch socket (21). A ball hitch connector (10) includes a spherical body or ball connector (12), a support base (14) for supporting the spherical body (12) on a tow bar (18) or the like, a fastener device (16) for securing the support base (14) to the tow bar (18), and releasable attachment mechanism (20) providing for quick interchanging of ball connectors (12). The releasable attachment mechanism (20) includes a latch pin (70) positioned in transversely extending bores (50, 60) of the support base (14) and the ball connector (12). The latch pin (70) is slidable between a released position wherein the ball connector (12) can be detached/attached to the support base (14) and a locked position wherein the ball connector (12) cannot be so removed. The ball hitch socket (21) obstructs the ends of the transverse bore (60) when positioned over the ball connector (12) such that the latch pin (70) cannot be moved from the locked position to the released position.

5 Claims, 4 Drawing Figures

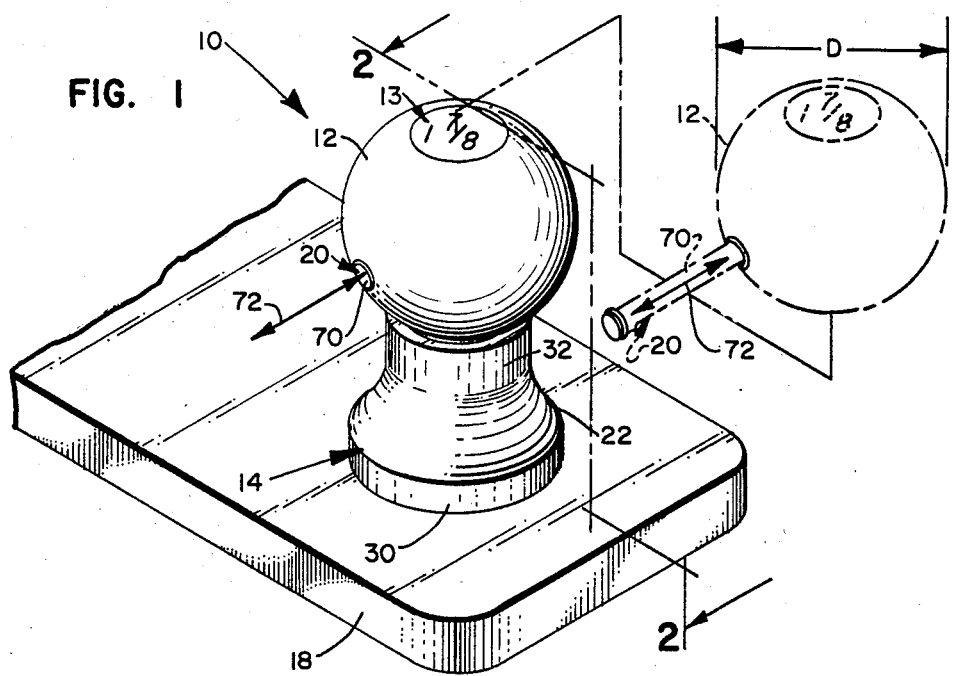
FIG. 1
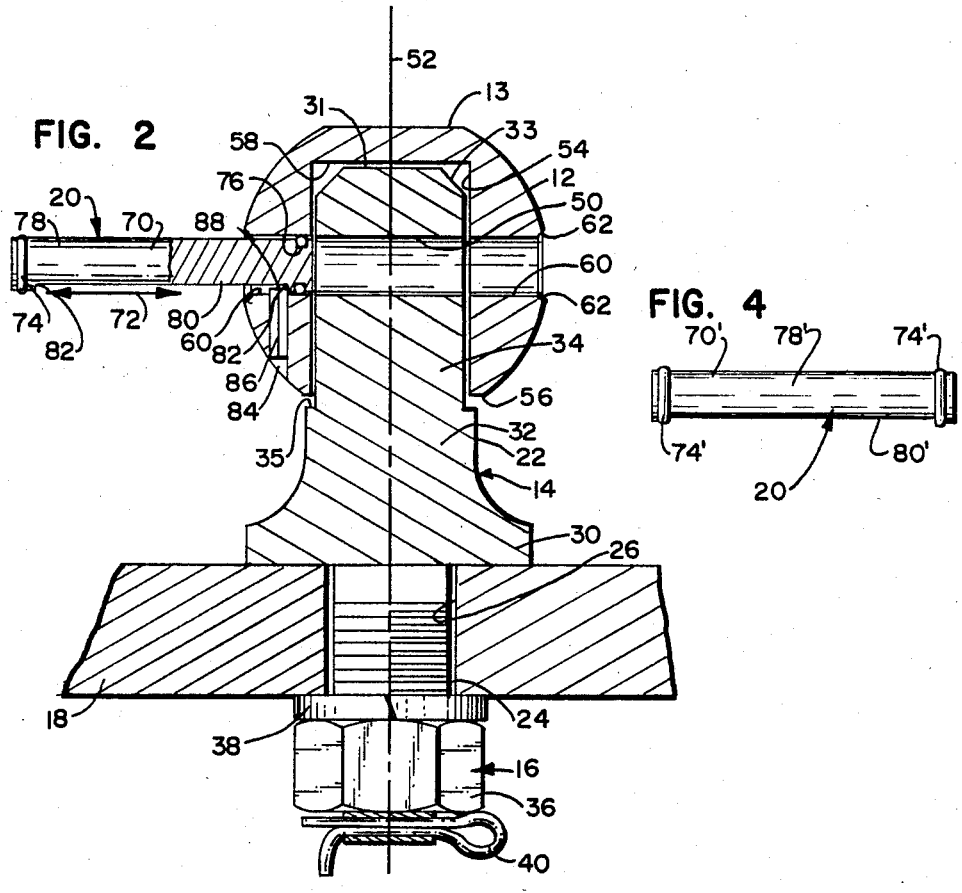
FIG. 2
FIG. 4

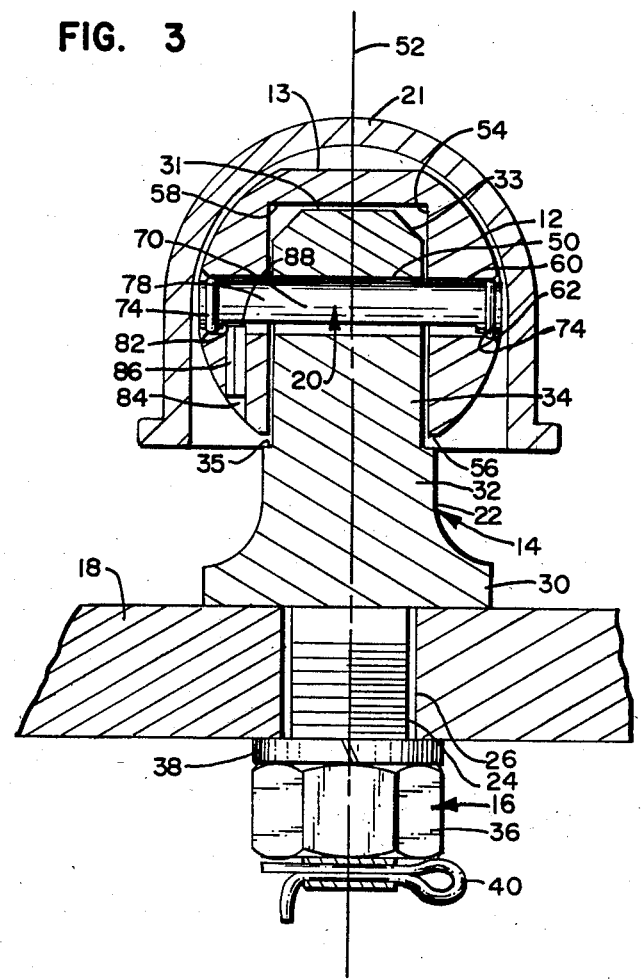

QUICK CHANGE BALL HITCH APPARATUS

BACKGROUND OF THE INVENTION

The present invention relates to hitch apparatus and more particularly, to a ball hitch apparatus having a quick change ball connector.

Ball and socket hitch connectors are some of the most popular and widely used devices for connecting a vehicle to be towed, such as a trailer, to a towing vehicle, such as a car, truck or tractor. A conventional ball and socket type hitch usually includes a spherical body, also referred to as a ball connector, that is adapted for attachment to a draw bar or tow bar of a towing vehicle. The tongue or hitch of the trailer or other vehicle to be towed is equipped with a socket adapted to fit over the spherical body or ball connector and includes movable and lockable jaws adapted to tighten under the spherical body to prevent the socket from being removed therefrom during towing operations. Such ball and socket hitch devices are relatively safe; they are easy to connect and disconnect, and they provide a hitch connection in which the tongue or hitch of the towed vehicle can pivot to a considerable extent in any plane about the hitch connection point.

Notwithstanding the popularity and wide acceptance of such ball and socket hitches for towing vehicles, there remain some heretofore unresolved problems with their use. One of the most pervasive and aggravating problems arises from the fact that the size of the spherical, ball-shaped body of the ball connector has to be matched rather closely with the size of the socket on the hitch or tongue of the vehicle to be towed. If the ball connector is too large for the socket, the socket will simply not fit over the ball connector and the trailer cannot be connected to the towing vehicle. On the other hand, if the spherical ball connector is too small for the socket, it might not be possible to get a secure connection of the socket to the ball connector. A severe safety hazard can result from such an insecure or ineffective connection of the trailer to the towing vehicle. Unfortunately, because of strength requirements, and in many instances, purely arbitrary decisions, trailer manufacturers equip their trailers with a variety of different sized sockets. Therefore, in order to use the same towing vehicle to tow different trailers, the ball connector on the towing vehicle often must be changed to a different size.

Changing conventional ball hitch connectors attached to tow bars of towing vehicles is not always an easy task, and it often requires large wrenches or other tools. If such tools are not available to the person at the time the ball hitch connector has to be changed, such a change is almost impossible. Further, it is not unusual for the bolts used to attach the ball hitch connectors to tow bars of vehicles to become severely damaged due to dragging on pavement, rocks and the like when the vehicle is driven through dips or over rough roads. When such damage occurs, removal of the ball hitch connectors can be a very difficult task, even with the proper tools available. Moreover, there is always the risk that during repeated changes of a conventional ball hitch connector, the ball hitch connector will not be properly tightened and will become loosened during use which can result in a safety hazard.

In recognition of this problem, interchangable ball hitch connector apparatus have been developed; for example, U.S. Pat. No. 4,433,854 to Smith. However, these interchangable ball hitch connector apparatus have several problems associated with them. For example, the Smith patent utilizes an internal releasable attachment mechanism for releasably attaching a ball connector to a support base. The releasable attachment mechanism includes a latch pin slidably positioned in a transverse bore and biased outwardly by a spring positioned in the bore behind the latch pin. It is quite possible for the operation of the releasable attachment mechanism to become obstructed or otherwise interferred with by dirt and the like. For example, dirt might prohibit the spring 40 from biasing the latch pin 32 outwardly. Moreover, dirt might block the cavity of the spherical body into which the latch pin is to project or protrude. Accordingly, a secure positive lock will be prevented. If the user is not careful or attentive when interchanging spherical bodies, it is quite possible that this impaired and improper functioning will go unnoticed when interchanging the ball connectors. Moreover, during use it is quite possible that the biasing spring might break or its operation become otherwise impaired such that the latch pin is no longer biased into the annular cavity of the spherical body so as to retain the spherical body in place. This can result in a severe safety hazard which most likely will go unnoticed by the operator due to the internal nature of the releasable attachment mechanism. Additionally, dirt and grease or the like might collect on the stub shaft of the support base or the stub shaft might otherwise become disfigured and/or the bore of the spherical body might become partially obstructed by dirt and grease or the like such that the spherical body is prevented from being properly positioned on the stub shaft. If the user is not attentive during the interchanging process it is quite possible that the spherical body will be positioned only part way onto the stub shaft of the support base, thereby preventing secure attachment by the internal releasable attachment mechanism. Indeed, it is quite possible that the internal releasable attachment mechanism is no longer present and this goes unnoticed by the operator during the interchanging process. Moreover, should the internal releasable attachment mechanism be lost, or its operation be otherwise impaired, this will necessitate replacement of the stub shaft.

These and many other problems associated with the prior art are solved by the present invention.

SUMMARY OF THE INVENTION

The present invention relates to a ball hitch connector apparatus adapted for use with a conventional ball hitch socket. The ball hitch connector apparatus includes a support base having an upwardly extending stub shaft, the stub shaft having a bore extending inwardly from an outer surface of the stub shaft. The ball hitch connector apparatus further includes a generally spherical body with a first bore extending radially inward from a bottom surface of the spherical body and being adapted to receive the stub shaft. The spherical body has a second bore extending inwardly from an outer surface of the spherical body so as to be in communication with the first bore. The second bore is positioned to align itself with the bore of the stub shaft when the stub shaft is inserted into the first bore of the spherical body and the spherical body is rotated to angularly align the bore of the stub shaft and the second bore of the spherical body. The ball hitch apparatus further includes latch pin means adapted to be received in the bore of the stub shaft and the second bore of the spherical body for retaining the spherical body on the stub shaft when the stub shaft is positioned into the first bore of the spherical body. The latch pin means is slidable between a locked position wherein the latch pin means is positioned in the bore of the stub shaft and the second bore of the spherical body and a released position wherein the latch pin means is removed from the bore of the stub shaft and extends beyond the outer surface of the spherical body. The ball hitch socket cooperates with the second bore of the spherical body to retain the latch pin means in the bore of the stub shaft and the second bore of the spherical body when the ball hitch socket is positioned over the spherical body. The latch pin means further includes retention means cooperating with the spherical body for retaining the latch pin means in the second bore of the spherical body when in the released position.

An advantageous feature of the present invention is the provision of a novel towing hitch which includes an easily detachable and interchangable ball connector for tow bars on towing vehicles.

Yet another advantage of the present invention is the provision of a ball hitch connector apparatus for towing vehicles including a variety of different sized ball connectors which cn be easily detached from the tow bar and replaced with a ball connector of another selected size.

Yet another advantageous feature of the present invention is the provision of a ball connector which can be detached from the tow bar of a towing vehicle without requiring the use of any special tools.

A further advantage of the present invention is the provision of a ball hitch connector apparatus having easily detachable and interchangable ball connectors for towing vehicles which is safe and resistant to wear or damage during use.

An advantage of one embodiment of the present invention is the provision of a ball hitch connector apparatus which includes a support base which is more or less permanently mounted on the tow bar of a vehicle and a ball connector which is easily attached to and detached from the support base, a latch pin being associated with each of the differing sized ball connectors. The latch pin includes retention means cooperating with a ball connector for retaining the latch pin at all times in association with the ball connector such that they do not become separated. Furthermore, retention of the latch pin with the ball connector provides an outwardly observable indication as to whether the latch pin is in the locked position or the released position. Accordingly, the user is not deceived into thinking the latch pin is in place should the bores of the latch mechanism become filled with dirt or grease or otherwise become blocked.

Yet another advantage of the present invention is the provision of a positive locked attachment mechanism. The ball hitch socket of a ball hitch apparatus cannot be positioned over the ball connector unless the latch pin is in the locked position. If the latch pin is out of the locked position and in the released position, the ball hitch socket cannot be positioned over the ball connector, as the latch pin will prohibit such connection. Moreover, once the latch pin is in the locked position and the ball hitch socket is positioned over the ball connector, the ball hitch socket cooperates to provide a positive locked effect wherein the latch pin cannot be moved into the released position. Accordingly, when the trailer or the like is hitched to the towing vehicle, the latch pin cannot be moved into the released position.

These and various other advantages and features of novelty which characterize the present invention are pointed out with particularity in the claims annexed hereto and forming a further part hereof. However, for a better understanding of the invention, its advantages and objects attained by its use, reference should be had to the drawings which form a further part hereof, and to the accompanying descriptive matter, in which there is illustrated and described a preferred embodiment of the present invention.

BRIEF DESCRIPTION OF THE DRAWINGS

In the drawings, in which like reference numerals and letters indicate corresponding parts throughtout the several views, FIG. 1 is a perspective view of an embodiment of a ball hitch connector in accordance with the principles of the present invention attached to a tow bar of a towing vehicle, a ball connector of the ball hitch connector being illustrated in phantom line as detached from its support base;

FIG. 2 is a cross-sectional view generally along the line 2—2 in FIG. 1, illustratng the latch pin of the releasable attachment mechanism in the released position;

FIG. 3 is a view similar to FIG. 2 illustrating a ball hitch socket positioned over the ball connector with the latch pin in the locked position; and FIG. 4 is a side elevational view of an alternate embodiment of the latch pin.

DETAILED DESCRIPTION OF THE PREFERRED EMBODIMENT

Referring now to the drawings, there is illustrated in FIGS. 1 through 3 an embodiment of a ball hitch connector 10 in accordance with the principles of the present invention. The ball hitch connector 10 includes four main components: a generally spherical body 12, also referred to as a ball connector, having an overall diameter D; a support base 14 for supporting the ball connector 12; a fastener device 16 for semi-permanently attaching the support base 14 to a tow bar 18 of a vehicle; and a releasable attachment mechnism 20 for releasably attaching the ball connector 12 to the support base 14. As illustrated in FIG. 3, the ball connector 12 is of the type adapted for connection to a conventional ball hitch socket 21 mounted conventionally on the tongue or hitch (not shown) of a trailer or other vehicle to be towed.

As previously indicated, the present invention enables interchanging of ball connectors having different diameters. As indicated by the preferred embodiment, the ball connector might include a substantially flat top surface 13 with indicia thereon indicating the diameter of the ball connector 12. For example, in FIG. 1, the ball connector is illustrated as including indicia indicating the ball connector 12 has a diameter of 1⅞ inches. It will be appreciated that numerous other methods might be utilized for indicating the diameter of the ball connectors. Moreover, such indication or indicia, while desirable, is not necessary to practice the present invention.

As illustrated, the preferred embodiment of the support base 14 includes a pedestal portion 22 extending upwardly from the tow bar 18 and an externally threaded stem portion 24 extending through and below a bore 26 in the tow bar 18. The pedestal portion 22 includes a large, flat bottom portion 30 and is tapered upwardly to form a narrower neck portion 32, and it terminates on top in an upright stub shaft portion 34. The stub shaft portion 34 is smaller in diameter than the upper portion of the neck portion 32, such that an annular collar 35 is formed around the base of the stub shaft portion 34. The stub shaft portion 34 has a substantially flat upper end surface 31 with beveled edges 33. In the preferred embodiment, the stub shaft portion 34 has a circular cross-section, so as to be substantially cylindrical in form. The externally threaded stem portion 24 in the embodiment shown extends through and beyond the bore 26 in the tow bar 18 to enable attachment of the support base 14 to the tow bar 18 by use of an internally threaded nut 36 and lock washer 38 combination. Although the lock washer 38 will usually secure the nut 36 against being unscrewed, the preferred embodiment of the present invention includes a cotter pin 40 as additionaly security to prevent the nut 36 from being unscrewed. Although a preferred embodiment is shown, it will be appreciated that numerous other methods for securing the support base 14 to the tow bar 18 might be utilized.

In the preferred embodiment, the stub shaft 34 is provided with a transversely extending cylindrical bore 50 extending completely through and stub shaft portion 34 from an outer surface on a first side of the stub shaft portion 34 to an outer surface on a second, opposite side of the stub shaft 34. Moreover, the transverse bore 50 preferably is radially extending so as to pass through a longitudinal axis 52 of the stub shaft portion 34 and is preferably of substantially uniform diameter.

The spherical body or ball connector 12 is provided with a radial bore 54 extending inwardly from a bottom surface 56 a distance which is preferably slightly less than the length of the stub shaft portion 34. Moreover, the radial bore is of a diameter sufficient to receive the stub shaft portion 34 therein and is preferably circular in cross-section so as to be cylindrical in form. The radial bore 54 preferably defines a substantially flat inner end surface 58 for cooperation with the substantially flat upper end surface 31 of the stub shaft portion 34. The ball connector 12 is further provided with a transverse bore 60 extending completely through the ball connector 12 from an outer surface at a first side to an outer surface at an opposite, second side. The transverse bore extends into the radial bore 54 so as to be in communication therewith. Moreover, the transverse bore preferably extends radially through the center of the ball connector 12 and is of the same general, cylindrical configuration as that of the transverse bore 50 of the stub shaft portion 34. In addition, the transverse bore 60 is positioned in the spherical body or ball connector 12 such that when the stub shaft portion 34 is inserted into the radial bore 54 of the ball connector 12, the transverse bore 60 of the ball connector 12 cn be made to line up with the transverse bore 50 of the stub portion 34 by rotation the ball connector 12 into the proper angular position. Preferably, the substantially horizontally extending transverse bore 50 of the stub shaft portion 34 and the substantially horizontally extending transverse bore 60 of the ball connector 12 are vertically positioned such that when the flat inner surface 58 of the ball connector 12 is resting on the substantially flat upper end surface 31 of the stub shaft portion 34, the bores 50 and 60 are horizontally aligned, as generally illustrated in FIG. 2. The transverse bore 60, as illustrated in FIG. 2, is preferably beveled at its ends 62.

The releasable attachment mechanism 20 includes a latch pin 70 which is slidably mounted in the transverse bore 60 of the ball connector 12. In the preferred embodiment shown, the latch pin 70 is cylindrical in nature and includes an "O" ring 74 mounted in a groove 76 at each end of the latch pin 70. As illustrated in FIGS. 2 and 4, in the preferred embodiment, the "O" ring 74 provides a seal between the latch pin 70 and the transverse bore 60 of the ball connector 12 and further provides a surface on which the latch pin 70 slides. The latch pin 70 includes an intermediate portion 78 which includes a substantially flat recessed surface 80 defining surfaces 82, also referred to as shoulders, extending transversely of a longitudinal axis of the latch pin 70 proximate the ends of the latch pin 70. A bore 84 extending inwardly from an outer surface of the ball connector 12 and at right angles to the transverse bore 60 is in communication with the transverse bore 60. Preferably the bore 84 is positioned below the latch pin 70. Securedly positioned in the bore 84 is a roll pin member 86 which projects slightly into the interior of the transverse bore 60 of the ball connector 12. An inner end 88 of the roll pin member 86 is positioned so as to enable slidable movement of the latch pin 70 along the intermediate portion 78 thereof between the shoulders 82. The roll pin member 86 enables the latch pin 70 to be slid outwardly a sufficient distance so as to not project into the radial bore 54 of the spherical body 12 and thus, to not interfere with positioning of the spherical body 12 over the stub shaft portion 34. However, the inner end 88 engages the shoulders 82 to limit the slidable movement of the latch pin 70. Accordingly, the roll pin member 86 prevents the latch pin 70 from being removed from the ball connector 12, even when the ball connector 12 is removed from the stub shaft portion 34. Thus, the latch pin 70 is retained at all times with the ball connector 12. Moreover, the roll pin member 86 prevents the latch pin 70 from being pushed out the opposite side of the ball connector 12. It will be appreciated that although a preferred embodiment of the retention mechanism is illustrated in FIGS. 2 and 4, alternative embodiments in keeping with the principles of the present invention might be utilized.

Illustrated in FIG. 4 is an alternative embodiment of a latch pin generally designated by the reference numeral 70' in accordance with the principles of the present invention. The latch pin 70' includes an intermediate portion 78' having a substantially flat recessed surface 80' defining transversely extending surfaces or shoulders 82' against which "O" rings 74' rest. As with the previous embodiment of the latch pin 70, this embodiment of the latch pin 70' is substantially cylindrical in form. With this embodiment, the end 88 of the roll pin 86 will engage the "O" rings 74' so as to restrict slidable movement of the latch pin 70'. This embodiment might be utilized with smaller diameter ball connectors 12.

In use, the ball connector 12 is positioned over the stub shaft portion 34 such that the stub shaft portion 34 is inserted into the radial bore 54 of the ball connector 12 so that the inner end surface 58 of the ball connector 12 rests on the substantially flat upper end surface 31 of the stub shaft portion 34. The ball connector is then rotated to enable angular alignment of the transverse bore 50 in the stub shaft portion 34 with the transverse bore 60 of the ball connector 12. The latch pin 70 is then slid into and through the transverse bore 50 of the stub shaft portion 34 and into the portion of the transverse bore 60 on the opposite side of the ball connector 12. In the preferred embodiment, the latch pin 70 is readily slidable such that the latch pin 70 can be slid by hand. If necessary, a small elongated utensil such as a key or the like, can be utilized to facilitate sliding of the latch pin 70. As illustrated in FIG. 3, the ball hitch socket 21 is then positioned over the ball connector 12 and secured in place. As illustrated, the transverse bore 60 of the ball connector 12 is positioned such that the ball hitch socket 21 obstructs the ends thereof when the ball hitch socket 21 is positioned over the ball connector 12 thereby locking the latch pin 70 in place. Accordingly, it is impossible for the latch pin 70 to be slid to a released position once the ball hitch socket 21 is attached. It will be appreciated that although the latch pin 70 of the preferred embodiment is illustrated as having a length substantially that of the ball connector 12, the length of the latch pin 70 of the embodiment shown must be at least sufficiently long to assure that when the ball hitch socket 21 is positioned over the ball connector 12 the latch pin 70 will be obstructed by the ball hitch socket 21 such that at least a portion of the latch pin 70 is positioned in the transverse bore 50 of the stub shaft portion 34. Moreover, as illustrated in FIG. 2, it is impossible to secure the ball hitch socket 21 to the ball connector 12 when the latch pin 70 is in a released position, since the latch pin 70 extends beyond the outer surface of the ball connector 12. The ball hitch socket 21 can only be secured to the ball connector 12 when the latch pin 70 is in a locked position, as illustrated in FIG. 3. This provides for a positive locking effect wherein the attachment mechanism 20 is either in a locked condition or in a released condition. Moreover, the attachment mechanism 20, an embodiment of which was previously described and is illustrated in FIGS. 2 and 4, insures that the latch pin 70 is retained with the ball connector 12. Not only does this prevent the latch pin 70 from becoming lost or disassociated with the ball connector 12, but more importantly, it provides a substantial safety factor in that a trailer or other vehicle being towed cannot be hitched up to the ball hitch connector 10 of the present invention unless the latch pin 70 is in a locked position.

It is to be understood that even though numerous characteristics and advantages of the present invention have been set forth in the foregoing description, together with details of the structure and function of the invention, the disclosure is illustrative only and changes may be made in detail, especially in matters of shape, size and arrangement of parts within the principles of the invention, to the full extent indicated by the broad general meaning of the terms in which the appended claims are expressed.

What is claimed is:

1. A ball hitch connector apparatus adapted for use with a conventional ball hitch socket, comprising:
    (a) a support base having an upwardly extending stub shaft portion, the stub shaft portion having a bore extending inwardly from an outer surface of the stub shaft portion;
    (b) a generally spherical body with a first bore extending radially inward from a bottom surface of the spherical body, the first bore being adapted to receive a stub shaft portion of the support base, the spherical body having a second bore extending inwardly from an outer surface of the spherical body so as to be in communication with the first bore, the second bore being positioned to align itself with the bore of the stub shaft portion of the support base when the stub shaft portion is inserted into the first bore of the spherical body and the spherical body is rotated to angularly align the bore of the stub shaft portion and the second bore of the spherical body; and
    (c) latch pin means adapted to be received in the bore of the stub shaft portion and the second bore of the spherical body for retention of the spherical body on the stub shaft portion when the stub shaft portion is positioned in the first bore of the spherical body, the latch pin means being slidable between a locked position wherein the latch pin means is positioned in the bore of the stub shaft portion and the second bore of the spherical body and a released position wherein the latch pin means is removed from the bore of the stub shaft portion and extends beyond the outer surface of the spherical body, the ball hitch socket cooperating with the second bore to retain the latch pin means in the bore of the stub shaft portion and the second bore of the spherical body when the ball hitch socket is secured to the spherical body, the latch pin means includes retention means cooperating with the spherical body for retaining the latch pin means in the second bore of the spherical body when in the released position.

2. A ball hitch connector apparatus adapted for use with a conventional ball hitch socket, comprising:
    (a) a support base having an upwardly extending stub shaft portion, the stub shaft portion having a bore extending inwardly from an outer surface of the stub shaft portion through to an opposite outer surface of the stub shaft portion;
    (b) a generally spherical body with a first bore extending radially inward from a bottom surface of the spherical body and being adapted to receive the stub shaft portion of the support base, the spherical body having a second bore extending inwardly from an outer surface of the spherical body through to an opposite outer surface of the spherical body, the second bore being in communication with the first bore, the second bore being positioned to align itself with the bore of the stub shaft portion when the stub shaft portion of the support base is inserted into the first bore of the spherical body and the spherical body is rotated to angularly align the bore of the stub shaft portion and the second bore of the spherical body; and
    (c) a latch pin adapted to be received in the bore of the stub shaft portion and the second bore of the spherical body, the latch pin being slidable between a locked position wherein the latch pin is positioned in the bore of the stub shaft portion and the second bore of the spherical body and a released position wherein the latch pin is removed from the bore of the stub shaft portion and extends beyond the outer surface of the spherical body, the spherical body including retention means cooperating with the latch pin for preventing the latch pin from being removed from the spherical body when in the released position, the ball hitch socket cooperating with the second bore of the spherical body to retain the latch pin in the bore of the stub shaft and the second bore of the spherical body when the ball hitch socket is secured to the spherical body thereby preventing accidental movement of the latch pin into the released position.

3. A ball hitch connector apparatus in accordance with claim 2, wherein the retention means includes a projection extending partially into the second bore of the spherical body, the latch pin including a recessed portion between first and second ends cooperating with the first and second ends to define shoulder portions proximate the first and second ends, the projection engaging the shoulder portions proximate the first and second ends to prevent removal of the latch pin from the spherical body.

4. A ball hitch connector apparatus in accordance with claim 3, wherein the latch pin is substantially cylindrical, the recessed portion of the latch pin including a relatively flat surface for slidable engagement with the projection.

5. A ball hitch connector apparatus in accordance with claim 4, wherein the first and second ends of the latch pin include an "O" ring for providing a seal between the latch pin and an inner surface of the second bore of the spherical body.

* * * * *

UNITED STATES PATENT AND TRADEMARK OFFICE
CERTIFICATE OF CORRECTION

PATENT NO. : 4,596,406
DATED : June 24, 1986
INVENTOR(S) : Robert D. Van Vleet and Robert G. Van Vleet It is certified that error appears in the above-identified patent and that said Letters Patent is hereby corrected as shown below:

Column 3, line 26, "cn" should be --can--;

Column 4, line 17, "throughtout" should be --throughout--;

Column 4, line 26, "illustratng" should be --illustrating--;

Column 5, lines 19 and 20, "additionaly" should be --additional--;

Column 5, line 57, "cn" should be --can--;

Column 6, line 22, "Securedly" should be --Securely--;

Signed and Sealed this
Twenty-fifth Day of November, 1986

Attest:

DONALD J. QUIGG

*Attesting Officer*  *Commissioner of Patents and Trademarks*

UNITED STATES PATENT AND TRADEMARK OFFICE
Certificate

Patent No. 4,596,406.  Patented: June 24, 1986

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Robert D. Van Vleet, Sidney, Nebraska; Robert G. Van Vleet, Sidney, Nebraska; and Daniel W. Van Vleet, Sidney, Nebraska.

Signed and Sealed this Twenty-First Day of March, 2000.

BRIAN L. JOHNSON
*Supervisory Patent Examiner*
Art Unit 3618